United States Patent [19]
Zheng et al.

[11] Patent Number: 5,570,446
[45] Date of Patent: Oct. 29, 1996

[54] ALIGNMENT AND CONTROL IN SPLICING OPTICAL FIBERS

[75] Inventors: Wenxin Zheng, Solna; Joakim Strom, Stockholm, both of Sweden

[73] Assignee: Telefoanaktiebolaget LM Ericsson, Stockholm, Sweden

[21] Appl. No.: 491,571

[22] Filed: Jun. 16, 1995

[30] Foreign Application Priority Data

Jun. 16, 1994 [SE] Sweden ................................. 9402127

[51] Int. Cl.$^6$ .................................................. G02B 6/255
[52] U.S. Cl. ........................ 385/98; 219/121.45; 385/96
[58] Field of Search .................. 385/96–98; 219/121.37, 219/121.38, 121.45, 121.46, 121.58, 121.59

[56] References Cited

U.S. PATENT DOCUMENTS

| | | | |
|---|---|---|---|
| 4,735,481 | 4/1988 | Lukas et al. | 385/139 |
| 4,911,524 | 3/1990 | Itoh et al. | 385/97 |
| 5,195,157 | 3/1993 | Penfold | 385/96 |
| 5,218,184 | 6/1993 | Hakoun et al. | 385/97 X |
| 5,249,247 | 9/1993 | Whitesmith | 385/96 |
| 5,414,788 | 5/1995 | Kammlott et al. | 385/96 |
| 5,487,125 | 1/1996 | Kammlott et al. | 385/96 |

FOREIGN PATENT DOCUMENTS

| | | | |
|---|---|---|---|
| 61-236509 | 10/1986 | Japan | 385/96 |
| 62-14606 | 1/1987 | Japan | 385/96 |
| 9201235 | 4/1992 | Sweden . | |
| 1720041 | 3/1992 | U.S.S.R. | 385/96 |
| 2271433 | 4/1994 | United Kingdom . | |
| 91/03751 | 3/1991 | WIPO . | |

*Primary Examiner*—John D. Lee
*Attorney, Agent, or Firm*—Burns, Doane, Swecker & Mathis, L.L.P.

[57] ABSTRACT

When splicing optical fibers by melt-fusioning in an electric arc, the electric arc is started, in order to give the fiber splice a large strength, before the ends of the fibers have entered the arc and before they have contacted each other. The arc is in this stage switched on with a low intensity which is increased in the stage when the fiber ends are fusioned to each other. When the electric arc is established having this low intensity and immediately before the contact of the end surfaces and the melt-fusioning, the fiber ends are finely aligned with each other in the lateral direction. It can be performed by way of the optical system and the controller means which are provided in a commercially available fiber welding apparatus, and the fine alignment will give the splice a low attenuation. For standard fibers of the single-mode type a welding current through the electrodes of approximately 6.5 mA is suitable.

16 Claims, 3 Drawing Sheets

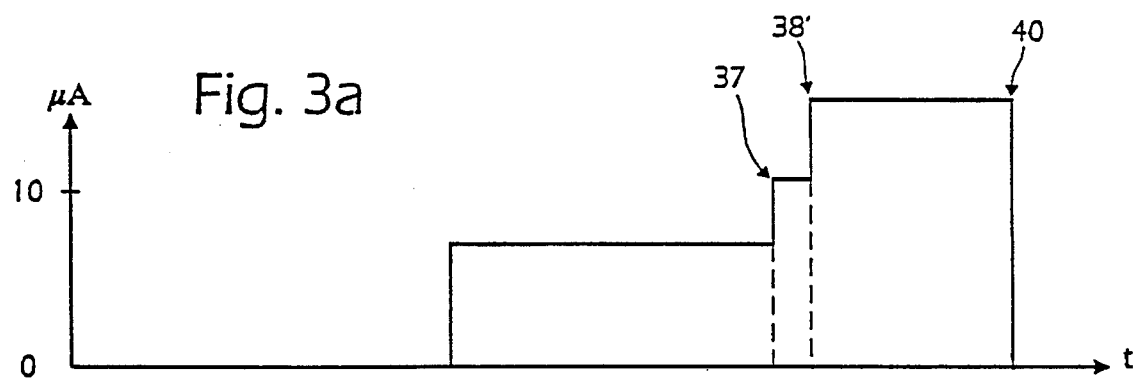
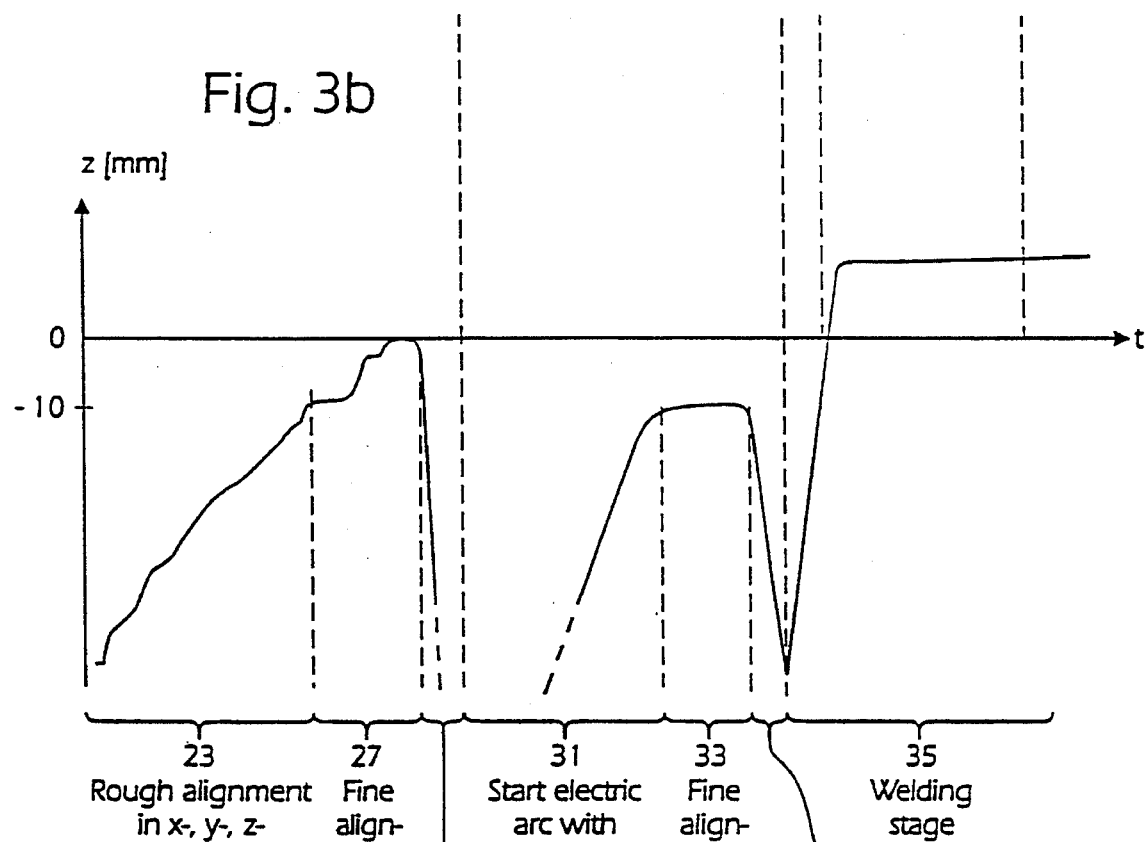

ALIGNMENT AND CONTROL IN SPLICING OPTICAL FIBERS

TECHNICAL FIELD

The present invention relates to alignment and control in splicing optical fibers and for achievement of splices having a large tensile strength.

BACKGROUND

When two optical fibers are spliced, in particular welded to each other, melt-fusioning by means of an electric arc is often used, but also other heating methods can be used for the fusioning, such as heating by means of a thermal heat ray or beam from a carbon dioxide laser. Further, different methods of pre-treatment for preparing the optical fibers for splicing are used and these methods comprise removing the polymer coating and other possible coverings and also dirt and particles attached to the surface of the optical fiber. Optical fibers of type single-mode having a standard diameter of 125 µm normally have a tensile strength of about 70–80 N. Such a high tensile strength is normally not achieved in welded splices between optical fibers but the values of the tensile strength can be as follows:

| Fiber end preparation | Fiber splicing | Tensile strength of splice |
|---|---|---|
| Normal mechanical stripper | Normal fusion splicing | 3–7 N |
| Non-contact mechanical stripper | Normal fusion splicing | 10–20 N |
| Non-contact acid stripper | Normal fusion splicing | 20–30 N |
| Non-contact acid stripper | Splicing with arc initiation when ends are remote | 30–60 N |
| Original optical fiber | No splice | 70–80 N |

A prior splicing method performed by igniting an electric arc or generally by starting the heating within a localized region, when the ends of the fibers are located at a distance therefrom and by then moving the fiber ends into the hot region where the heating is intensified more, so that the fiber ends are melted and then are fused together ("Remote Arc Initiation Method"), gives the achieved splice very good tensile strength values. Such high tensile strength values are in particular desired for fibers used in difficult environmental conditions such as for fibers in optical fiber cables used under water or for fiber devices to be used in military applications. However, when using this splicing method a relatively large and uncontrollable loss or attenuation of the transmitted light is obtained in a spliced fiber. This depends on the fact that the fiber ends have to be moved back to the actual electric arc region in order to make it possible to perform the fusioning and the fact that in this movement the alignment of the fiber ends with each other will not be good or will be lost, mainly depending on mechanical imperfections of the mechanical control and guide means and on the fact that electric or other forces from the electric arc itself can affect the free portions of two fiber ends in different ways, so that they may be somewhat bent or deflected from their original non-influenced state. The alignment error can be as large as 10 µm when the fiber ends get in contact with each other and the fusioning begins. Such an alignment error can in turn result in a loss in the splice comprising up to 0.5–1 dB. A loss of this magnitude is not acceptable in many applications.

PRIOR ART

The published International patent application WO-A1 91/03751 deals with a procedure of the mentioned kind, "Remote arc initiation splicing method", for fusion-splicing optical fibers aiming at achieving a strong splice having a low attenuation. First the fiber ends are made to contact each other and a lateral alignment is performed. Then the ends are moved to be separated by a distance of typically 80 µm between their end surfaces. Then the end surfaces are moved towards each other and at a distance of 50 µm the electric arc is started with a low current of 7–11 mA (in the case of welding single-mode fibers of e.g. standard type having in that case a diameter of 125 µm), when the fibers are moved towards each other with a low velocity (200 µm/s). The movement is continued until the fiber ends reach the earlier established location of contact and are thereafter displaced a short distance further towards each other, whereafter the welding current is increased to 10–13 mA for 2 seconds. Thereafter the fiber ends are pulled away from each other, back again the same distance that they where displaced beyond the earlier established contact location.

The patent application GB-A 2 271 433 relates to a further developed form of this method comprising a "reciprocating" welding procedure comprising steps according to FIG. 2 thereof for starting an electric arc having a low current, when the fibers are located at a distance from the arc, whereafter the current is increased after the fibers have been moved towards the electric arc.

Similar methods are described in the patent documents U.S. Pat. Nos. 5,249,247, 5,195,157 and 4,735,481.

In our earlier Swedish patent application 9201235-0, filed Apr. 16, 1992, a control of arc fusioning in splicing optical fibers is described using a controlled pulsed heat supply for achieving a good alignment of the fiber ends.

SUMMARY

It is an object of the invention to provide a control in splicing fibers, that results in splices having a large tensile strength and a low attenuation.

This object is achieved by the invention, the characteristics and features of which appear from the appended claims.

In the previously known methods for achieving splices having a large tensile strength the mechanical guides of the used splicing apparatus, in particular the mechanical guides in the longitudinal direction of the fiber ends, are assumed to be sufficiently accurate over a relatively long distance and the mechanical stability of the fiber ends is also assumed to sufficiently high, to make it possible to return, from an earlier well aligned position where the end surfaces of the fiber ends are in contact with each other, to this same position. At such a return movement, however, if an active alignment is made by observing the fiber ends in the same manner as conventionally used in the original alignment and if this procedure is performed at a lower welding current or generally for a less intense heating, when the fiber ends and their positions easily can be observed and can be continuously determined, and then according to the observations the fiber ends are displaced laterally in relation to each other to an aligned position, a good alignment of the fiber ends laterally will be achieved also in the fusioning or welding position, to which the fibers only have to be moved a short distance from the place where the fine alignment was made. An alignment is here suitably made by aligning the outer surfaces of the fiber ends, that is the outer surfaces of the fiber claddings, since the fibers prepared for welding have always been stripped of the exterior protective coating, this alignment procedure resulting in the intended alignment of the fiber cores, since it is principally this alignment which produces a low loss in a finished splice. The procedure described above thus results in a low loss in the splice combined with also a maintained high tensile strength of the spliced fiber.

For the splicing of two ends of optical fibers to each other an automatic fiber splicing apparatus of the commercially available type can be used, which then as conventional has retaining and displacement means such as movable chucks, which can retain the fiber ends with the longitudinal directions thereof essentially parallel to each other and which can move the ends, while maintaining the essentially parallel state of the fiber ends, both in the longitudinal direction of the fiber ends and in cross directions perpendicular to this direction, usually in two directions perpendicular to each other and thus also perpendicular to the longitudinal direction. Furthermore heat supply means are provided, e.g. in the shape of electrodes having driver circuits for forming an electric arc, or a laser source. They are located so that heat is supplied to a limited region and in particular to a first region into which and inside which the outermost regions of the ends of optical fibers, which are mounted in the chucks, can be displaced by activating the driver means for the chucks. In addition control means are arranged, such as an electronic processor circuit, for controlling and activating and switching off the driver means for the chucks and the driver circuits for the heat supply. The control means can be set or programmed so that the following steps will be executed before and after a splicing operation:

that the driver means of the retaining and displacement means are activated so that the end surfaces of fiber ends retained by the retaining and displacement means are positioned in a first position opposite to each other very close to or engaging each other in the centre of the region to which heat can be supplied by the heat supply means, that the driver means of the retaining and displacement means are thereafter given signals so that they displace the fiber ends in the longitudinal direction thereof to a second position where the end surfaces are located at some distance from each other, advantageously to a position where the end surfaces are located at a fairly large distance outside the first region and where they cannot be heated by the heat from the heat supply means, that the driver means of the retaining and displacement means are then controlled to again move the end surfaces in the longitudinal direction of the fiber ends towards each other to the first position and that during this movement the driver circuits of the heat supply are activated in order to supply heat to the first region, so that during this movement the outermost regions or portions of the fiber ends, that is the portions of the fibers located near the end surfaces thereof, gradually enter the region heated by the heat supply means, that the driver circuits for the heat supply are controlled to increase or intensify, when the fiber ends return to the first position, the heat supply to the first region in order to produce a melting of the outermost regions of the fiber ends and a melt-fusioning or welding of the fiber ends to each other for forming a fused splice, and that finally the driver circuits for the heat supply are controlled to terminate or interrupt the heat supply so that the heated regions of the fiber ends can cool to make a finished splice.

The control means are further arranged to execute an additional step, wherein they activate the driver means of the retaining and displacement means in order to perform, during the movement of the end surfaces of the fibers towards each other, when the outermost portions of the fiber ends gradually enter the first heated region, an active alignment of the fiber ends by means of a displacement of the fiber ends in a cross direction essentially perpendicular to the longitudinal directions of the fiber ends, so that the longitudinal axes of the fiber ends after this alignment will be positioned along essentially the same line or that the outer surfaces of the fiber claddings are well aligned. This alignment is then made close to or near the welding or splicing position and during the following movement towards the welding position no large deviations laterally of the position of the fibers can occur, amongst other things depending on the fact that the end regions of the fibers are already located in the heated region.

The control circuits can control the driver means for the displacement during the process of aligning the fiber ends with each other so that the movement velocity of the fiber ends in the longitudinal direction thereof towards each other is reduced or so that this movement temporarily is interrupted, in order to make time for carrying out the alignment before the end surfaces come into contact with other in the first position where they are to be welded to each other.

Before or at the same time as the fiber ends for the first time are moved to the first position, an alignment of the fiber ends by means of laterally displacing the fiber ends can also be carried out in the conventional way.

During the first heating stage, in the case of electric arc welding, the heat from the electric arc in the first region should advantageously have such a low intensity that the portions of the fiber ends which are located in the electric arc region are not melted at all and so that neither the surface material will become noticeably softer while the heating is maintained completely stable. This provides a stable influence of the electric arc on the fiber ends. Advantageously, as seen from another general aspect, it is only required that the inner material of the fiber ends during the first heating will remain not melted or that the stiffness of the fiber ends is maintained during all of the time during this stage of the heating. This is important since the fiber ends could otherwise be somewhat bent and then loose their previous good alignment during the movement towards the welding position.

BRIEF DESCRIPTION OF THE DRAWINGS

The invention will now be described in more detail by way of a not limiting embodiment and with reference to the accompanying drawings in which.

DETAILED DESCRIPTION

Figure 1:
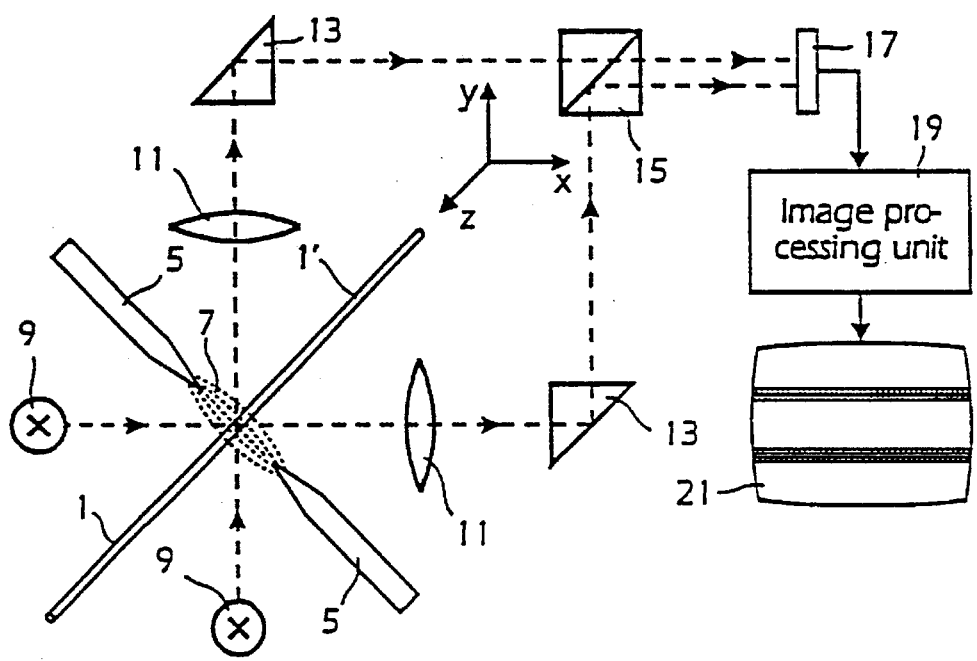
FIG. 1 is a schematic view of the main optical parts of a device used in splicing optical fibers.
Figure 2:
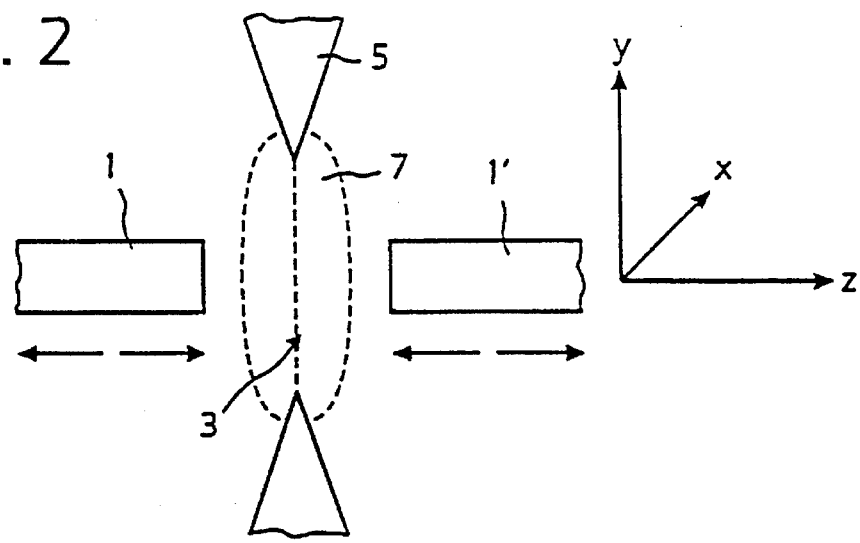
FIG. 2 is a side view of the region at the fiber ends and adjacent to the welding electrodes of the device in FIG. 1, FIGS. 3a and 3b are diagrams of the electrical current in the electric arc and the relative distance between two fiber ends as functions of time in arc welding.

In splicing two optical fibers 1, 1' an automatic splicing apparatus may be used, the general configuration thereof, in particular its optical components, being schematically illustrated in FIG. 1. In the splicing apparatus there are thus two welding electrodes 5, between which an electric arc can be formed when an electric voltage is provided to the two electrodes 5. In FIG. 2 the region which is important for the welding, near and at the points of the electrodes 5, is shown in a larger scale. In fusion-welding of the two end surfaces of the fibers 1, 1' to each other the fiber ends are moved so that both fiber ends become aligned with each other having their longitudinal axes along the same line or equivalently that the outer surfaces of their claddings are aligned, i.e. the displacement is carried out in the x- and y-directions according to the coordinate system shown in the figures. The fiber ends are also moved forwards in the z-direction, that is in a direction essentially parallel to the longitudinal axes of the fibers, which are also essentially perpendicular to the straight connection line 3 between the points of the electrodes 5, and the movement is continued to a position of the end surfaces at this line in the middle of the electric arc so that the fiber ends will thus be located having their end surfaces placed in the position for splicing or welding.

In the optical system used, which is in particular shown in FIG. 1, there are two lamps 9 illuminating the welding position for the two fibers 1 and 1' in two directions perpendicular to each other and also perpendicularly to the longitudinal direction of the fiber ends. The light from the lamps 9 is focused or made parallel by means of lenses 11, whereafter the parallel light beams produced are deflected in a right angle by reflecting elements 13 and are made to hit a beam splitter 15, which in this case is used in the inverted sense as a beam collector for collecting or directing the two rays from the two perpendicular directions along the same path onto the same TV-camera or CCD-camera 17 comprising a surface of photo-sensitive elements for receiving the light beams. From the TV-camera 17 the video signal produced therein is transmitted to an image processing unit 19, by means of which the images of the fiber ends can be displayed on a monitor or display element 21. On the display element 21 the welding position of the fiber ends can then be shown in the same picture as two simultaneous partial images, which are taken in the two perpendicular directions and are placed on top of each other.

Based on the images of the splicing position an image processing operation in the unit 19 is executed so that the alignment in the cross directions or laterally, i.e. in the x- and y-directions, and the positioning of the end surfaces of the fibers abutting each other in the middle of the electric arc can be carried out automatically by means of control signals from the image processing unit 19 to driver motors, which will be briefly described below with reference to FIG. 4. This image processing operation and the results thereof can be used in a control procedure for achieving a welded splice of the fiber ends, for achieving a welded splice having a high tensile strength and a low attenuation for light propagating in the fibers. This procedure is illustrated in the diagrams of FIGS. 3a and 3b, where in the diagram of FIG. 3a the current supplied to the welding electrodes in mA is plotted as a function of time and in the diagram of FIG. 3b the relative position of the surfaces of the fiber ends in the z-direction, with a zero position in the weld position of the ends, is plotted, also as a function of time.

During a first stage 23 a rough alignment and positioning of the fiber ends is carried out, preferably first a lateral alignment in the x- and y-directions and then a forward movement to a position close to the region where the electric arc 7 is to be formed. Further, during this stage the images of the fiber ends are observed and in particular the outlines or contours thereof in order to decide whether the end surfaces are sufficiently perpendicular to the longitudinal directions of the fiber ends, i.e. that the cutting off of the fiber ends has been carried out in a correct way, and also that the fiber ends are positioned correctly in the image, e.g. parallel to each other and to some reference line like a horizontal line. This is made for checking that the fibers have been correctly positioned in the retainers and that for instance dirt particles or similar things therein do not give them an oblique position. In a second stage 27 following the first stage a fine positioning of the fiber ends both in the lateral directions and in the longitudinal direction of the fiber ends is carried out, so that the welding position of the fiber ends in the z-direction is accurately determined. This position is memorized in some way, e.g. by storing the value of a control signal for the driver motors for displacement in the z-direction in a memory for later use.

In a third stage 29 the fiber ends are only displaced in the z-direction, by activating the respective driver motors, so that the fiber ends are moved to a position as far away as possible from each other in the longitudinal direction. This position where the end surfaces are located at a long distance from the contact position at the line 3, see FIG. 2, can correspond to a distance of several millimeters and shall be so large that both fiber ends are located at a sufficient distance from the region, where the electric arc 7 will be present. When the end surfaces are at this sufficient distance from each other and from the line 3, in the next step 31 a voltage is supplied to the electrodes, so that a low current will flow between the electrodes 5 and the electric arc will be formed. As a result of the fact that the fiber ends are positioned at a distance from the electric arc 7, when it is ignited, dirt and particles, that are flung out from the electrodes 5, when the electric arc is started, will not hit the fiber ends. If such particles should hit a fiber end, it could reduce the strength of the splice which is to be produced. At the same time as the ignition is made, the displacement of the fiber ends towards each other is started again, towards the earlier determined contact position of the end surfaces.

The electrical current passing between the electrodes 5 can typically comprise about 6.5 mA for a single-mode fiber of standard type having a diameter of 125 $\mu$m and should for fibers having diameters of this magnitude of order always be in the range of 5–8 mA. For a too low electrical current the electric arc 7 can become unstable and even be switched on and off intermittently, what can affect the position of the fiber ends and drastically reduce the strength of the splice to be produced. Furthermore, the current should be so low that any melting or noticeable softening of the surface material will not occur, when the outermost portion of a fiber end enters the electric arc. The fiber end will then of course also maintain its original stiffness.

When the outermost surfaces of the fiber ends are at a short distance of a few micrometers of each other, e.g. of the magnitude of order 10 $\mu$m, in the next step 33 a fine alignment in the cross directions is carried out, i.e. in the x- and y-directions, so that the longitudinal axes of the fiber ends will be positioned along the same line. During this process it can be necessary to stop temporarily or slow down the movement of the fiber ends towards each other. During all of the time the electric arc 7 is supplied with essentially the same low current and the light from the electric arc and the light emitted from the heated sections of the fiber ends do not at this low heating power interfere with the visual observation of the region comprising the fiber ends or the image detection and capturing of this region by means of the camera 17.

After this the actual fusion-welding operation can begin. Therefor the fibers are again separated somewhat in the step 34 to a little longer distance between the end surfaces thereof, which can be typically 50 µm. Hereby the electric arc 7 can better penetrate between the end surfaces of the fiber ends for heating them. After this a compressing and fusion-welding stage 35 follows. The fiber ends have still an accurate lateral alignment and they are moved towards each other, like in the steps 29, 31 and 34, by driving only motors for the longitudinal movement. The movement is first made to the earlier welding position accurately determined in the step 27. Simultaneously, at the time indicated at 37 in FIG. 3a, the electrical current in the electric arc 7 is increased, so that a melting of the portions of the fiber ends inside the electric arc begins. The current can now typically be 10–11 mA and it is increased even more at a time indicated at 38 in FIG. 3a, when the end surfaces of the fibers reach the earlier determined welding position in the z-direction, where they now also with a very large probability will come in contact with each other. The current can now for the normal case be about 15–18 mA and for this current the heating of the outermost portions of the fiber ends is increased even more, so that they will melt and the fiber ends are fusion-welded to each other.

The movement of the fiber ends towards each other is now however not interrupted but is allowed to continue so that the material at the end surfaces is compressed and the surfaces are somewhat plastically deformed. Thereby possible angular errors of the end surfaces can be corrected in the conventional manner. After a suitable time in this compressed state, the electric arc 7 is switched off at a time indicated at 40, the fusioned splice of the fibers 1, 1' is allowed to cool and the splice is finished and then the spliced fiber can be removed from the splicer apparatus.

Figure 4:
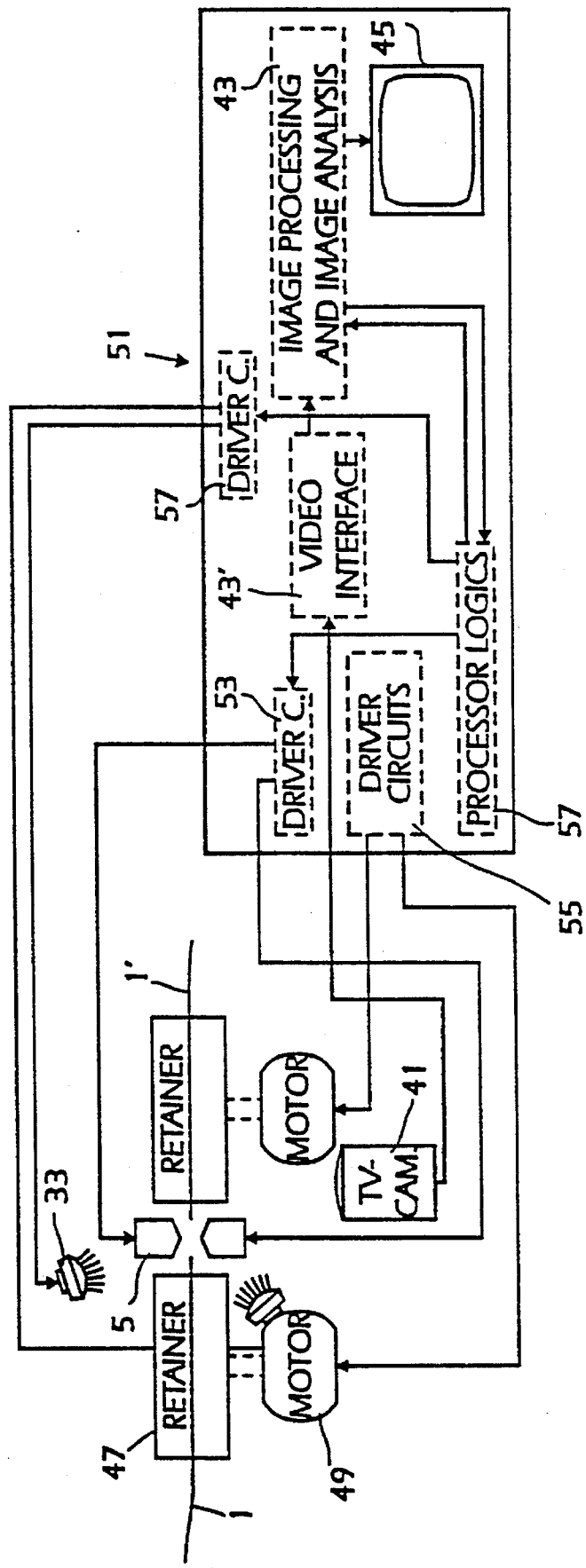
FIG. 4 is a schematic view of the main electronic components of a device used in splicing optical fibers.

In the schematic diagram of FIG. 4 of a fiber splicing apparatus of the automatic type retainers or chucks 41 are shown, in which the fiber ends are placed and retained during the positioning and splicing. The retainers 41 are movable in the three directions of the coordinate axes, both parallel to the longitudinal direction (the z-direction) and two directions perpendicular to this direction (the x- and y-directions) both of which are also perpendicular to the illumination direction from one of the lamps 9. The retainers 41 are thus operated along suitable mechanic guides, not shown, by control motors 43. Electrical lines to the electrodes 5 and to the motors 43 and to the lamps 9 are arranged from an electronics module 45 and from driver circuits 47, 49 and 51 respectively therein. From the TV-camera an electrical line is provided to a video interface 53 in the electronics module 45, wherefrom a suitable image signal is transmitted to an image processing and image analysing unit 19, compare FIG. 1. The different procedural steps in the splicing process are controlled by a control circuit 55, e.g. in the shape of a suitable microprocessor. The control circuit 55 hence executes the above mentioned procedural steps and thus controls the movement of the fiber ends in relation to each other by activating the motors 43 in suitable movement directions, provides a signal to the image processing and image analysis unit 19 to begin analysing a captured image and determining the lateral offset or displacement, such as this can be observed in the two directions perpendicular to each other, and determining the distance between the end surfaces in the longitudinal direction. Furthermore, the control circuit 55 controls the switching-on and the switching-off of the lamps 33, and the times when a voltage is to be provided to the electrodes 5 and when the voltage shall be interrupted, and the magnitude of the current passing between the electrodes 5.

We claim:

1. A method for splicing ends of optical fibers, comprising the steps of:

moving the fiber ends to a first position with end surfaces extending in a cross plane substantially perpendicular to longitudinal directions of the fiber ends, placed opposite, adjacent, or engaging each other;

moving the fiber ends in the longitudinal directions to a second position where the end surfaces are located at distance from each other;

moving again the end surfaces in the longitudinal directions of the fiber ends towards each other to the first position and then supplying heat to a first region, including the region where the end surfaces were present when the fiber ends were located in the first position, so that outermost portions of the fiber ends gradually enter the heated first region;

increasing or intensifying, when the fiber ends again reach the first position, the heat supply to the first region to produce a melting of the outermost portions of the fiber ends and a fusioning of the fiber ends to each other making a fusion splice;

allowing the end portions to cool;

wherein, during the movement of the end surfaces towards each other, when the outermost portions of the fiber ends gradually enter the heated first region and before the fiber ends reach the first position, making an alignment of the fiber ends by means of movement of the fiber ends in relation to each other in at least one direction perpendicular to the longitudinal directions of the fiber ends, so that the longitudinal axes of the fiber ends will be positioned along substantially the same line.

2. The method of claim 1, wherein during the step of aligning the fiber ends with each other, the movement velocity of the fiber ends towards each other in the longitudinal direction is reduced or temporarily interrupted.

3. The method of claim 1, wherein, before or at the same time as the fiber ends for the first time are moved to the first position, the fiber ends are aligned by a displacement of the fiber ends in relation to each other in at least one direction perpendicular to the longitudinal direction of the ends, so that the longitudinal axes of the fiber ends will extend along substantially the same line.

4. The method of claim 1, wherein the step including the first heating further comprises supplying heat to the first region in such a low intensity that at least the inner material of the fiber ends remains non-melted with a maintained stiffness of the fiber ends.

5. The method of claim 1, wherein the step of supplying heat to the first region further comprises providing an electric voltage between two electrodes forming an electric arc between the electrodes, and locating the electrodes so that the electric arc comprises a region including where the end surfaces of the fiber ends were located, when the fiber ends were positioned in the first position.

6. The method of claim 5, wherein the electric voltage provided between the two electrodes forming the electric arc is supplied such that, when the fiber ends are moved towards each other in the longitudinal direction of the fiber ends to the first position, the heat supply in the first region is insufficient to melt those portions of the fibers ends that enter the first region.

7. The method of claim 5, wherein the electric voltage supplied between the electrodes forming the electric arc is such that, when the fiber ends are moved towards each other in the longitudinal direction of the fiber ends to the first position, the electric arc remains stable all of the time.

8. The method of claim 5, wherein the electric voltage provided between the electrodes is such that the current between the electrodes is in the range between 5 and 8 mA when the fiber ends are again moved towards each other in the longitudinal direction of the fiber ends to the first position.

9. A device for splicing two ends of optical fibers, comprising:

means for retaining the ends, with the longitudinal directions substantially parallel to each other, and for displacing the ends while maintaining the substantially parallel state thereof, both in the longitudinal direction of the fiber ends and perpendicularly to this direction;

means for supplying heat to a first region where the outermost regions or portions of the ends of two optical fibers retained by the retaining and displacement means can be moved by the retaining and displacement means;

control means for, activating the retaining and displacement means to position the end surfaces of the retained ends in a first position opposite to each other in the center of the region to which heat is supplied by the heat supply means;

activating the retaining and displacement means in order to move the fiber ends in the longitudinal directions to a second position where the end surfaces are located at a distance from each other;

activating the retaining and displacement means to displace again the end surfaces, in the longitudinal directions of the fiber ends, towards each other to the first position and then activating the heat supply means to supply heat to the first region so that the outermost portions of the fiber ends enter gradually this heated region;

controlling the heat supply means to increase or intensify, when the fiber ends again reach the first position, the heat supply to the first region in order to achieve a melting of the outermost portions of the fiber ends and a fusioning of the fiber ends to each other in order to form a fusioned splice;

controlling finally the heat supply means to switch off the heat supply to allow the heated regions to cool, and activating the retaining and displacement means during the movement of the end surfaces towards each other, when the outermost portions of the fiber ends gradually enter the heated first region and before the fiber ends reach the first position, to align the fiber ends by displacing the fiber ends in relation to each other in at least one direction perpendicular to the longitudinal direction of the ends, so that the longitudinal axes of the fiber ends will extend along substantially the same line.

10. The device of claim 9, wherein the control means is arranged to control the retaining and displacement means during the activation thereof for alignment of the fiber ends with each other, so that the transport velocity of the fiber ends towards each other in the longitudinal directions thereof is reduced or so that this movement is temporarily interrupted.

11. The device of claim 9, wherein the control means controls the retaining and displacement means in order to also perform, before or at the same time as the fiber ends for the first time are moved to the first position, an alignment of the fiber ends by displacing the fiber ends in relation to each other in at least one direction perpendicular to the longitudinal directions of the ends, so that the longitudinal axes of the fibers will extend along substantially the same line.

12. The device of claim 9, wherein the control means controls the heat supply means during the first heating for supplying heat to the first region with such an intensity that at least the inner material of the fiber ends remains non-melted and that the stiffness of the fiber ends is maintained during all of the first heating.

13. The device of claim 9, wherein the heat supply means further comprises electrodes and means, controlled by the control means, for providing an electric voltage to the electrodes in order to form an electric arc between the electrodes.

14. The device of claim 13, wherein the control means controls the means that provides an electric voltage to the electrodes for forming the electric arc, so that when the retaining and displacement means is activated to move again the fiber ends towards each other in the longitudinal directions of the fiber ends to the first position, the heating of the fiber ends is insufficient to melt any portion thereof.

15. The device of claim 13, wherein the control means controls the means for providing an electric voltage to the electrodes for forming the electric arc with such an intensity or magnitude that, when the retaining and displacement means is activated to move again the fiber ends towards each other in the longitudinal directions of the fiber ends to the first position, the heat supply for the electric arc is as small as possible while maintaining a stable condition of the electric arc.

16. The device of claim 13, wherein the control means controls the means for providing an electric voltage to the electrodes for forming the electric arc so that between the electrodes a current flows of between 5 and 8 mA when the retaining and displacement means is activated to move again the fiber ends towards each other in the longitudinal direction of the fiber ends to the first position.

* * * * *